A. H. SHOEMAKER.
PROTECTIVE COVERING FOR PNEUMATIC TIRES.
APPLICATION FILED MAR. 7, 1911.
1,014,613.
Patented Jan. 9, 1912.
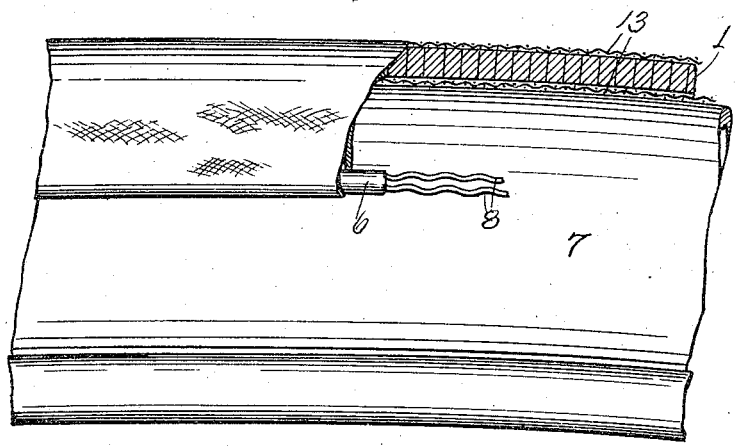
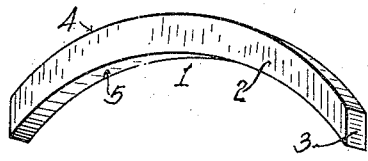
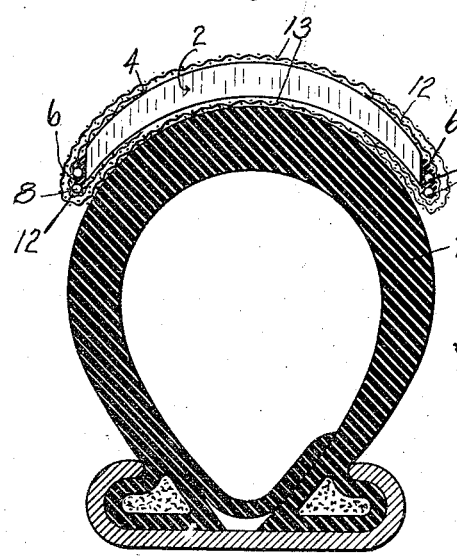
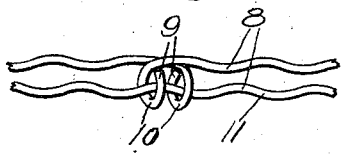
WITNESSES:
L. G. Zesbaugh
H. Barnes
INVENTOR:
Alvin H. Shoemaker
BY
Pierre Barnes
ATTORNEY

UNITED STATES PATENT OFFICE.

ALVIN H. SHOEMAKER, OF SEATTLE, WASHINGTON, ASSIGNOR, BY DIRECT AND MESNE ASSIGNMENTS, OF ONE-EIGHTH TO CARL H. YOECKEL, OF SEATTLE, WASHINGTON, AND THREE-EIGHTHS TO JOHN W. HURLEY AND ONE-HALF TO HENRY COPENHAGEN, BOTH OF PORTLAND, OREGON.

PROTECTIVE COVERING FOR PNEUMATIC TIRES.

1,014,613. Specification of Letters Patent. Patented Jan. 9, 1912.

Application filed March 7, 1911. Serial No. 612,961.

*To all whom it may concern:*

Be it known that I, ALVIN H. SHOEMAKER, a citizen of the United States, residing at Seattle, in the county of King and State of Washington, have invented certain new and useful Improvements in Protective Coverings for Pneumatic Tires, of which the following is a specification.

This invention relates to pneumatic tires, and particularly to superposed renewable treads therefor.

The object of the invention is the provision of a device of simple and relatively inexpensive construction that can be readily applied to a tire and which will maintain itself in operative position under all conditions of normal use.

Another object of the invention is to provide a tire covering of such flexibility that it will constantly assume under service conditions the form and amount of distortion of the tire upon which used therefore placing the latter under no undue restraint and avoiding any liability of damage to the tire.

It has the further object of providing a tire protector that is not easily penetrated by sharp articles and which increases the tractive qualities of the tire.

With these and other objects in view, the invention consists in the novel construction and arrangement of radially disposed segmental elements and the adaptation and combination therewith of devices for resiliently securing the same together in annular form and affording means for reliably securing the same to an inflated pneumatic tire.

In the accompanying drawings, Figure 1 is a fragmentary side elevational view of a pneumatic tire with a tire protector embodying my invention, shown partly in section, applied thereto. Fig. 2 is a cross sectional view of the same. Fig. 3 is a perspective view of one of the elements of the protective covering. Fig. 4 is a detail fragmentary view of the crimped anchor wires and illustrating a preferred method of securing the ends of same.

The tire protective covering of my invention comprises a plurality of similarly formed elements 1 having parallel plane sides 2, substantially vertical ends 3, and upper and lower edges 4 and 5, respectively, curving in a similar direction. The latter is preferably shaped to conform to the curvature of an inflated pneumatic tire, while the outer surface may be curved to any suitable degree. Said elements may be formed of any suitable composition, as of rubberized fabric, or leather, having stability of texture and flexibility and are assembled in side by side relation in the form of an annulus with an interior diameter approximately equal to the extreme diameter of the tire with which designed to be used. The respective ends 3 of the element are in alinement and are joined together at each side by a body 6 of plastic rubber, or the like, in which is embedded anchor wires 8. Said wire is crimped in uniform undulations to afford a degree of longitudinal elasticity and desirably extend peripherally about the covering two or more times. A simple and effective manner of securing the ends of said wires is illustrated in Fig. 4 and consists in overlapping the respective ends 9 thereof and forming in each such end a looped bend 10 about the adjacent turn 11 of the wire and disposed in opposed crossed relation so that when additional strains are imposed upon said wire, said ends will interfere and jam into closer contact and more efficiently secure said ends from disengagement the greater the strains thereon.

Desirably about each of the lateral edges of said annulus is arranged a relatively narrow strip 12 of adhesive fabric, commonly called "friction cloth" which has been treated with a rubber solution. Said strip envelops said plastic body 6 with which it is pressed in intimate contact and extends for a distance above and below said annulus toward the medial portion of same. 13 is a covering of adhesive fabric extending entirely about the annulus and including within itself the entire described structure to which it is caused to adhere.

As before stated, the elements forming the annulus may be composed of rubberized fabric and in such and analogous cases the various applications of rubber thereto may be set and permanently secured in their proposed operative condition through vulcanization. Where vulcanizing heat may adversely affect the durability of the constituent elements, as may be the case where leather or equivalent material is employed, a self hardening rubber, cement or the like, may be utilized both in the plastic embedding body and in the treatment of the enveloping fabric.

To mount protective covering upon a tire, the latter is first deflated whereupon said covering may be symmetrically arranged about the perimeter thereof. As the tire is inflated a pressure in radial directions is imparted upon the annulus which affords sufficient friction to retain the latter against independent rotary movements. The inwardly curving configuration of the contacting edge 5 of said elements causes the annulus to constantly assume a medial position upon said tire and the more or less inextensible character of the lateral edges 3 thereof due to the securement given by the said anchor wires prevents any dislocation in lateral directions.

I deem the provision of the undulating anchor wires secured to the individual elements through a resilient adhering body as one of the principal inventive features of my new construction. Thus considerable pliancy and extensibility reside in the structures of these members due to their undulating form; also the body in which they are embedded and their means of attachment to the segmental elements is elastic to a high degree insuring that when shocks are encountered or strains placed upon any part unduly the same will be distributed and transmitted throughout the construction without danger of disrupting any of the component parts thereof.

A device for securing said elements together without allowing for a considerable extensibility between such a device as described does not bind upon the inflated tire with sufficient pressure to distort the same from the normal curvature intended for it and consequently does not cause said tire to extend laterally under the peripheral compression caused by an inextensible band thereabout. Consequently, the life of the tire is increased by avoiding tendencies of rim cutting and the annulus will retain itself in its said medial position under all normal conditions owing to the maximum curvature of the tire being maintained and the concavity given the annulus will be amply sufficient to secure it thereupon.

While a certain amount of particularity has been used in explaining the various parts and members of my invention, I do not confine myself to the exact construction illustrated or described but expressly state that all changes in detail, or modifications within the scope of the appended claims are contemplated in the spirit of the invention.

What I claim as my invention and desire to secure by Letters-Patent, is—

1. In a protective covering for pneumatic tires, the combination with a tire, of a plurality of elements in side-by-side relation forming an annulus about the perimeter of said tire and capable of independent radial movements, a body of elastic material secured to the lateral edges of said elements, and undulating anchor wires embedded in said body upon each side of said elements about the perimeter of said annulus.

2. In a protective covering for pneumatic tires, the combination with a tire, of a plurality of elements in side-by-side relations forming an annulus about the perimeter of said tire and capable of independent radial movements, of a body of elastic material secured to the lateral edges of said elements, anchor wires embedded in said body upon each side of said elements about the perimeter of said annulus, and a flexible covering for said elements and securing means.

Signed at Portland, Oregon, this 13 day of February 1911.

ALVIN H. SHOEMAKER.

Witnesses:
 W. A. BURKE,
 CARL H. YOECKEL.